United States Patent
Chiu et al.

(10) Patent No.: US 9,117,180 B1
(45) Date of Patent: Aug. 25, 2015

(54) MATCHING METHOD BASED ON A MACHINE LEARNING ALGORITHM AND A SYSTEM THEREOF

(71) Applicant: Elance, Inc., Mountain View, CA (US)

(72) Inventors: Kwan-Min Chiu, Fremont, CA (US); Daniel-Augustin Grad, Sunnyvale, CA (US); Nidhi Gupta, Los Altos, CA (US)

(73) Assignee: Elance, Inc., Mountain View, CA (US)

( * ) Notice: Subject to any disclaimer, the term of this patent is extended or adjusted under 35 U.S.C. 154(b) by 151 days.

(21) Appl. No.: 13/837,826

(22) Filed: Mar. 15, 2013

(51) Int. Cl.
*G06N 3/08* (2006.01)
*G06N 99/00* (2010.01)
*H04N 21/25* (2011.01)
*G06F 17/00* (2006.01)
*H04N 21/466* (2011.01)

(52) U.S. Cl.
CPC ............ *G06N 99/005* (2013.01); *G06F 17/602* (2013.01); *G06F 17/604* (2013.01); *G06N 3/08* (2013.01); *H04N 21/251* (2013.01); *H04N 21/252* (2013.01); *H04N 21/4661* (2013.01)

(58) Field of Classification Search
None
See application file for complete search history.

(56) References Cited

U.S. PATENT DOCUMENTS

| | | | |
|---|---|---|---|
| 4,703,325 A | 10/1987 | Chamberlin et al. | |
| 4,799,156 A | 1/1989 | Shavit et al. | |
| 5,008,853 A | 4/1991 | Bly et al. | |
| 5,220,657 A | 6/1993 | Bly et al. | |
| 5,548,506 A | 8/1996 | Srinivasan | |
| 5,557,515 A | 9/1996 | Abbruzzese et al. | |
| 5,592,620 A | 1/1997 | Chen et al. | |
| 5,664,115 A | 9/1997 | Fraser | |
| 5,715,402 A | 2/1998 | Popolo | |
| 5,732,400 A | 3/1998 | Mandler et al. | |
| 5,794,207 A | 8/1998 | Walker et al. | |
| 5,835,896 A | 11/1998 | Fisher et al. | |
| 5,842,178 A | 11/1998 | Giovannoli | |
| 5,862,223 A | 1/1999 | Walker et al. | |
| 5,905,975 A | 5/1999 | Ausubel | |
| 5,924,082 A | 7/1999 | Silverman et al. | |
| 5,949,976 A | 9/1999 | Chappelle | |
| 5,956,715 A | 9/1999 | Glasser et al. | |

(Continued)

FOREIGN PATENT DOCUMENTS

| EP | 0 952 536 A1 | 10/1999 |
|---|---|---|
| WO | 01/73645 A1 | 10/2001 |

OTHER PUBLICATIONS

Paolucci et al., Semantic Matching of Web Services Capabilities, 2002.*

(Continued)

*Primary Examiner* — Jeffrey A Gaffin
*Assistant Examiner* — Nathan Brown, Jr.
(74) *Attorney, Agent, or Firm* — Haverstock & Owens LLP

(57) ABSTRACT

Embodiments of the present invention are directed to a matching method that implements a machine learning algorithm to serve one or more matches to an individual and to ensure that an outcome of each match is more likely than not to be successful. A recommendation engine uses the machine learning algorithm to perform predictive analysis to thereby select one or more members of an online community to match or pair with the individual, based on at least structured data, unstructured data or both of the individual and/or each selected member. The recommendation engine is configured to continuously learn from past user behavior, including the individual's, to further improve future matches provided to the individual.

18 Claims, 5 Drawing Sheets

(56) References Cited

U.S. PATENT DOCUMENTS

| | | | |
|---|---|---|---|
| 5,966,130 A | 10/1999 | Benman, Jr. |
| 6,009,154 A | 12/1999 | Rieken et al. |
| 6,041,307 A | 3/2000 | Ahuja et al. |
| 6,049,777 A | 4/2000 | Sheena et al. |
| 6,061,665 A | 5/2000 | Bahreman |
| 6,064,980 A | 5/2000 | Jacobi et al. |
| 6,078,906 A | 6/2000 | Huberman |
| 6,092,049 A | 7/2000 | Chislenko et al. |
| 6,101,482 A | 8/2000 | DiAngelo et al. |
| 6,119,101 A | 9/2000 | Peckover |
| 6,119,149 A | 9/2000 | Notani |
| 6,128,624 A | 10/2000 | Papierniak et al. |
| 6,141,653 A | 10/2000 | Conklin et al. |
| 6,154,731 A | 11/2000 | Monks et al. |
| 6,161,099 A | 12/2000 | Harrington et al. |
| 6,208,659 B1 | 3/2001 | Govindarajan et al. |
| 6,223,177 B1 | 4/2001 | Tatham et al. |
| 6,226,031 B1 | 5/2001 | Barraclough et al. |
| 6,233,600 B1 | 5/2001 | Salas et al. |
| 6,292,792 B1 | 9/2001 | Baffles et al. |
| 6,311,178 B1 | 10/2001 | Bi et al. |
| 6,336,105 B1 | 1/2002 | Conklin et al. |
| 6,374,292 B1 | 4/2002 | Srivastava et al. |
| 6,415,270 B1 | 7/2002 | Rackson et al. |
| 6,442,528 B1 | 8/2002 | Notani et al. |
| 6,484,153 B1 | 11/2002 | Walker et al. |
| 6,557,035 B1 | 4/2003 | McKnight |
| 6,564,246 B1 | 5/2003 | Varma et al. |
| 6,567,784 B2 | 5/2003 | Bukow |
| 6,598,026 B1 | 7/2003 | Ojha et al. |
| 6,735,570 B1 | 5/2004 | Lacy et al. |
| 6,832,176 B2 | 12/2004 | Hartigan et al. |
| 6,859,523 B1 | 2/2005 | Jilk et al. |
| 6,871,181 B2 | 3/2005 | Kansal |
| 6,931,385 B1 | 8/2005 | Halstead et al. |
| 6,938,048 B1 | 8/2005 | Jilk et al. |
| 7,069,242 B1 | 6/2006 | Sheth et al. |
| 7,096,193 B1 | 8/2006 | Beaudoin et al. |
| 7,155,400 B1 | 12/2006 | Jilk et al. |
| 7,310,415 B1 | 12/2007 | Short |
| 7,406,443 B1 | 7/2008 | Fink et al. |
| 7,437,327 B2 | 10/2008 | Lam et al. |
| 7,444,374 B1 | 10/2008 | Baker |
| 7,466,810 B1 | 12/2008 | Quon et al. |
| 7,587,336 B1 | 9/2009 | Wallgreen et al. |
| 7,752,080 B1 | 7/2010 | Greener |
| 8,024,225 B1 | 9/2011 | Sirota et al. |
| 8,224,755 B2 | 7/2012 | Goodman |
| 8,380,709 B1 | 2/2013 | Diller et al. |
| 8,512,143 B2 | 8/2013 | Jung et al. |
| 2001/0011222 A1 | 8/2001 | McLauchlin et al. |
| 2001/0034630 A1 | 10/2001 | Mayer et al. |
| 2001/0041988 A1 | 11/2001 | Lin |
| 2002/0010685 A1 | 1/2002 | Ashby |
| 2002/0023046 A1 | 2/2002 | Callahan et al. |
| 2002/0032576 A1 | 3/2002 | Abbot et al. |
| 2002/0054138 A1 | 5/2002 | Hennum |
| 2002/0120522 A1 | 8/2002 | Yang |
| 2002/0120554 A1 | 8/2002 | Vega |
| 2002/0129139 A1 | 9/2002 | Ramesh |
| 2002/0133365 A1 | 9/2002 | Grey et al. |
| 2002/0161707 A1 | 10/2002 | Cole et al. |
| 2002/0194077 A1 | 12/2002 | Dutta |
| 2003/0014294 A1 | 1/2003 | Yoneyama et al. |
| 2003/0046155 A1 | 3/2003 | Himmel et al. |
| 2003/0055780 A1 | 3/2003 | Hansen et al. |
| 2003/0101126 A1 | 5/2003 | Cheung et al. |
| 2003/0120603 A1 | 6/2003 | Kojima et al. |
| 2003/0191684 A1 | 10/2003 | Lumsden et al. |
| 2003/0220843 A1 | 11/2003 | Lam et al. |
| 2004/0063463 A1 | 4/2004 | Boivin |
| 2004/0064436 A1 | 4/2004 | Breslin et al. |
| 2004/0122926 A1 | 6/2004 | Moore et al. |
| 2004/0215560 A1 | 10/2004 | Amalraj et al. |
| 2004/0230511 A1 | 11/2004 | Kannan et al. |
| 2005/0043998 A1 | 2/2005 | Bross et al. |
| 2005/0131830 A1 | 6/2005 | Juarez et al. |
| 2005/0222907 A1 | 10/2005 | Pupo |
| 2006/0031177 A1 | 2/2006 | Rule |
| 2006/0122850 A1 | 6/2006 | Ward et al. |
| 2006/0136324 A1 | 6/2006 | Barry et al. |
| 2006/0185609 A1 | 8/2006 | Sato |
| 2006/0195428 A1 | 8/2006 | Peckover |
| 2006/0212359 A1 | 9/2006 | Hudgeon |
| 2007/0005536 A1 | 1/2007 | Caswell et al. |
| 2007/0027746 A1 | 2/2007 | Grabowich |
| 2007/0027792 A1 | 2/2007 | Smith |
| 2007/0067196 A1 | 3/2007 | Usui |
| 2007/0073610 A1 | 3/2007 | Marugabandhu et al. |
| 2007/0078699 A1 | 4/2007 | Scott et al. |
| 2007/0112671 A1 | 5/2007 | Rowan |
| 2007/0130059 A1 | 6/2007 | Lee et al. |
| 2007/0162379 A1 | 7/2007 | Skinner |
| 2007/0174180 A1 | 7/2007 | Shin |
| 2007/0174394 A1 | 7/2007 | Jayaweera |
| 2007/0192130 A1 | 8/2007 | Sandhu |
| 2007/0233510 A1 | 10/2007 | Howes |
| 2008/0010598 A1 | 1/2008 | Smilowitz et al. |
| 2008/0059523 A1 | 3/2008 | Schmidt et al. |
| 2008/0065444 A1 | 3/2008 | Stroman et al. |
| 2008/0082662 A1 | 4/2008 | Dandliker et al. |
| 2008/0104495 A1 | 5/2008 | Craig |
| 2008/0109491 A1 | 5/2008 | Gupta |
| 2008/0134292 A1 | 6/2008 | Ariel et al. |
| 2008/0154783 A1 | 6/2008 | Rule et al. |
| 2008/0184135 A1 | 7/2008 | Washburn et al. |
| 2008/0187114 A1 | 8/2008 | Altberg et al. |
| 2008/0294631 A1 | 11/2008 | Malhas et al. |
| 2009/0011395 A1 | 1/2009 | Schmidt et al. |
| 2009/0017788 A1 | 1/2009 | Doyle et al. |
| 2009/0055404 A1 | 2/2009 | Heiden et al. |
| 2009/0055476 A1 | 2/2009 | Markus et al. |
| 2009/0112728 A1 | 4/2009 | Evers et al. |
| 2009/0116403 A1 | 5/2009 | Callanan et al. |
| 2009/0132345 A1 | 5/2009 | Meyssami et al. |
| 2009/0177691 A1 | 7/2009 | Manfredi et al. |
| 2009/0210282 A1 | 8/2009 | Elenbaas et al. |
| 2009/0234706 A1 | 9/2009 | Adams et al. |
| 2009/0241035 A1 | 9/2009 | Tseng et al. |
| 2009/0241172 A1 | 9/2009 | Sennett et al. |
| 2009/0265205 A1 | 10/2009 | Stinchcombe et al. |
| 2009/0287592 A1 | 11/2009 | Brooks et al. |
| 2009/0327081 A1 | 12/2009 | Wang et al. |
| 2010/0017253 A1 | 1/2010 | Butler et al. |
| 2010/0088749 A1 | 4/2010 | Steeples |
| 2010/0115040 A1 | 5/2010 | Sargent et al. |
| 2010/0162167 A1 | 6/2010 | Stallings et al. |
| 2010/0191591 A1 | 7/2010 | Silbert |
| 2010/0287525 A1 | 11/2010 | Wagner |
| 2011/0107088 A1 | 5/2011 | Eng et al. |
| 2011/0238505 A1 | 9/2011 | Chiang et al. |
| 2011/0238768 A1 | 9/2011 | Habets et al. |

OTHER PUBLICATIONS ants.com web pages [online]. Ants.com [retrieved on Aug. 22, 2008]. Retrieved from the Internet: <URL: http://www.ants.com/ants/>.

bizbuyer.com web pages [online]. BizBuyer.com, Inc. [retrieved on Aug. 18-21, 2000]. Retrieved from the Internet: <URL: http://www.bizbuyer.com/>.

BullhornPro web pages [online]. Bullhorn, Inc. [retrieved on Jan. 4, 2001]. Retrieved from the Internet: <URL: http://www.bullhornpro.com/>.

Cassidy, M., "Going for Broke," San Jose Mercury News, Monday, Aug. 16, 1999, pp. 1E and 4E, published in San Jose, CA.

Davenport, Thomas H. and Keri Pearlson, "Two Cheers for the Virtual Office," Summer 1998, abstract, retrieved from the Internet: <URL: http://www.pubservice.com/MSStore?ProductDetails.aspx?CPC=3944>.

efrenzy.com web pages [online]. eFrenzy, Inc. [retrieved on Aug. 22, 2000]. Retrieved from the Internet: <URL: http://www.efrenzy.com/index.jsp>.

(56) References Cited

OTHER PUBLICATIONS

Eisenberg, D., "We're for Hire, Just Click," Time Magazine, Aug. 16, 1999, vol. 154, No. 7 [online] [retrieved on Aug. 19, 1999]. Retrieved from the Internet: <URL: http://www.pathfinder.com/time/magazine/articles/0,3266,29393,00.html>.
eworkexchange.com web pages [online]. eWork Exchange, Inc. [retrieved on Aug. 18-22, 2000]. Retrieved from the Internet: <URL: http://www.eworks.com/>.
eWork Exchange web pages [online]. eWork Exchange, Inc. [retrieved on Jan. 5, 2001]. Retrieved from the Internet: <URL: http://www.eworks.com/>.
eWork ProSource web pages [online]. eWork Exchange, Inc. [retrieved on Jan. 3, 2001]. Retrieved from the Internet: <URL: http://www.ework.com/>.
FeeBid.com web pages [online]. FeeBid.com [retrieved on Dec. 18, 2000]. Retrieved from the Internet: <URL: http://www.feebid.com>.
freeagent.com web pages [online]. FreeAgent.com [retrieved Aug. 18-22, 2000]. Retrieved from the Internet: <URL: http://www.freeagent.com/>.
guru.com.com web pages [online]. Guru.com, Inc. [retrieved Aug. 18, 2000]. Retrieved from the Internet: <URL: http://www.guru.com/>.
Herhold, S., "Expert Advice is Collectible for Start-up," San Jose Mercury News, Monday, Aug. 16, 1999, pp. 1E and 6E, San Jose, CA.
hotdispatch.com web pages [online]. HotDispatch, Inc. [retrieved on Aug. 22, 2000]. Retrieved from the Internet: <URL: http://www.hotdispatch.com/>.
"IBNL Forges Into the Future of Buying and Selling with Source Interactive Software," PR Newswire, Jan. 10, 1996. [replacement copy retrieved on May 4, 2009]. Retrieved from Internet: <URL: http://www.highbeam.com>.
Humphreys, Paul et al., "A Just-in-Time Evaluation Strategy for International Procurement," MCB UP Limited, 1998, pp. 1-11.
imandi.com web pages [online]. Imandi Corporation [retrieved on Aug. 22, 2000]. Retrieved from the Internet: <URL: http://www.imandi.com/>.
Malone, Thomas W. et al., "The Dawn of the E-Lance Economy," Harvard Business Review, Sep.-Oct. 1998, pp. 145-152.
morebusiness.com, "How to Write Winning Business Proposals: Writing Strategies," Office Action dated Oct. 6, 2011, <http://www.morebusiness.com/running_your_business/management/v1n11.brc>, published Aug. 1, 1998.
"Netscape Selects Netopia as the Exclusive 'Virtual Office' Offering on the New Netscape Small Business Source Service," PR Newswire, May 11, 1998, Mountain View and Alameda, California.
onvia.com web pages [online]. Onvia.com [retrieved Aug. 22, 2000]. Retrieved from the Internet: <URL: http://www.onvia.com/usa/home/index.cfm>.
Opus360 web pages [online]. Opus360 Corporation [retrieved on Jan. 3, 2001] Retrieved from the Internet: <URL: http://www.opus360com/>.
smarterwork.com web pages [online]. smarterwork.com, Inc. [retrieved on Aug. 22, 2000]. Retrieved from the Internet: <URL: http://www.smarterwork.com/>.
workexchange.com web pages [online]. WorkExchange, Inc. [retrieved Aug. 22, 2000]. Retrieved from the Internet: <URL: http://www.workexchange.com/unique/workexchange/index1.cfm>.
madbid.com [online] <URL: http://web.archive.org/web/20080829025830//http://uk.nadbid.com/faq/>.
Massimo Paolucci et al. "Semantic Matching of Web Services Capabilities" Carnegie Mellon University, 2002, Springer-Verlag Berlin Heidelberg, p. 333-347.

* cited by examiner

| Function | Role | Skills |
|---|---|---|
| → Engineering | → Web Developer | PHP |
| Product | Mobile Developer | HTML |
| Sales | QA Engineer | Javascript |
| Marketing | ⋮ | CSS |
| ⋮ | | |

MATCHING METHOD BASED ON A MACHINE LEARNING ALGORITHM AND A SYSTEM THEREOF

FIELD OF THE INVENTION

The present invention relates to an improved matching method that is based on a machine learning algorithm and a system thereof.

BACKGROUND OF THE INVENTION

A traditional hiring process is a long and cumbersome. FIG. 1 illustrates the traditional hiring process 100. Assume a client has a job to fill and a contractor is looking to fill a job vacancy. At a step 105a, the client creates and publishes a job posting for the job opening. The creation of the job posting can be a tedious process, especially if the client is not familiar with the job. If the client does not know the skills associated the job, the client might create a job posting that lacks information for one to fully understand what the job entails. At a step 110a, the client passively waits for resumes or proposals submitted in response to the job posting. At a step 115a, if the client does not receive resumes or proposals or qualified ones, the client would need to pro-actively reach out to candidates. There are many reasons why the client does not receive resumes or proposals in response to the job posting. For example, an incomplete job posting might not be meaningfully returned as a part of a search result and/or understood by contractors when making decisions to apply or not.

At a step 105b, a contractor searches for job openings or leads. In a bad economy when job openings are scarce, the contractor may need to search for some time until the contractor finds something worthwhile. At a step 110b, after the contractor finally finds a job opening, the contractor drafts a resume or a proposal tailored to the job opening. At a step 115b, the contractor sends the resume or proposal to the job opening.

At a step 120, the client evaluates all the resumes or proposals the client has received after a certain period of time. At a step 125, the client interviews some or all of the candidates. At a step 130, the client performs negotiations with the candidates. At a step 135, the client makes hiring decisions. At a step 140, the client and/or the contractor hope for a success.

The traditional hiring process 100 is a stop and go process due to the amount of waiting it takes after each step and can take weeks, if not months, to fill a job opening. Even when the opening is filled, there is no predictability in the result in regards to whether the client will be satisfied with the hired contractor or vice versa. For example, the client and the hired contractor might find it difficult to work with each other because they are in different time zones, or the client likes to micro-manage while the hired contractor prefers to be macro-managed. The traditional hiring process 100 does not provide trustworthy results as trust issues exist in the traditional hiring process 100.

The present invention addresses at least these limitations in the prior art.

SUMMARY OF THE INVENTION

Embodiments of the present invention are directed to a matching method that implements a machine learning algorithm to serve one or more matches to an individual and to ensure that an outcome of each match is more likely than not to be successful. A recommendation engine uses the machine learning algorithm to perform predictive analysis to thereby select one or more members of an online community to match or pair with the individual, based on at least structured data, unstructured data or both of the individual and/or each selected member. The recommendation engine is configured to continuously learn from past user behavior, including the individual's, to further improve future matches provided to the individual.

In one aspect, a non-transitory computer-readable medium is provided. The non-transitory computer-readable medium stores instructions that, when executed by a computing device, cause the computing device to perform a method. The method includes determining a first set of requirements for a buyer and determining a second set of requirements for each service provider belonging to a group of service providers.

In some embodiments, each set of requirements include at least one structured datum, at least one unstructured datum or a combination thereof. A structured datum is explicit, and an unstructured datum is implicit.

In some embodiments, an unstructured datum is behavior datum. In some embodiments, an unstructured datum can be a positive user action or a negative user action.

In some embodiments, a structured datum includes function/role/skills, geography, time zone, languages, availability, or budget. In some embodiments, structured datum includes job details or job history.

The method also includes performing predictive analysis based on all sets of requirements, thereby intelligently suggesting at least one match between the buyer and a service provider belonging to the group of service providers such that the match is more likely than not to be successful. In some embodiments, success is defined as a hire and an eventual positive feedback.

In some embodiments, the predictive analysis is based on a machine learning algorithm configured to learn from past user behavior.

In some embodiments, the method also includes using requirements of a community in making the suggestion. Typically, the buyer and the group of service providers belong to the community.

In some embodiments, the method also includes tracking actions of each user participating in the community.

In some embodiments, the method also includes providing at least one communication mechanism configured to allow a direct live communication between the buyer and the service provider belonging to the group of service providers.

In some embodiments, the method also includes providing access to an online profile associated with the service provider belonging to the group of service providers.

In another aspect, a system is provided. The system typically includes an online community for hiring and working on demand, and a recommendation engine. The online community includes members. The recommendation engine is configured to perform predictive analysis to intellectually pair an individual with at least one member of the online community such that the pairing is based at least on behavior characteristics determined by a machine learning algorithm. In some embodiments, recommendation engine, the members, and the individual are communicatively coupled.

In some embodiments, the at least one member is able to be timely committed to the individual during a specified period identified by the individual.

In some embodiments, the members includes clients and contractors. Typically, the clients have jobs to be filled and the contractors are looking to fill the jobs. A job can be role based or deliverable based.

In some embodiments, the recommendation engine is also configured to determine a first success rate of an outcome of a match between the individual and a first member, to determine a second success rate of an outcome of a match between the individual and a second member, and to present one of the two matches with the higher success rate.

In some embodiments, the recommendation engine is also configured to obtain structured data of a user, determine unstructured data of the user based on past behavior of the user in the online community, and assign a weight to each datum of the structured data and unstructured data.

In some embodiments, the recommendation engine is also configured to communicatively couple with one or more social networks to access one or more social graphs associated with the one or more social networks. The one or more social graphs are used by the machine learning algorithm during the performance.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

DETAILED DESCRIPTION OF THE INVENTION

Figure 1:
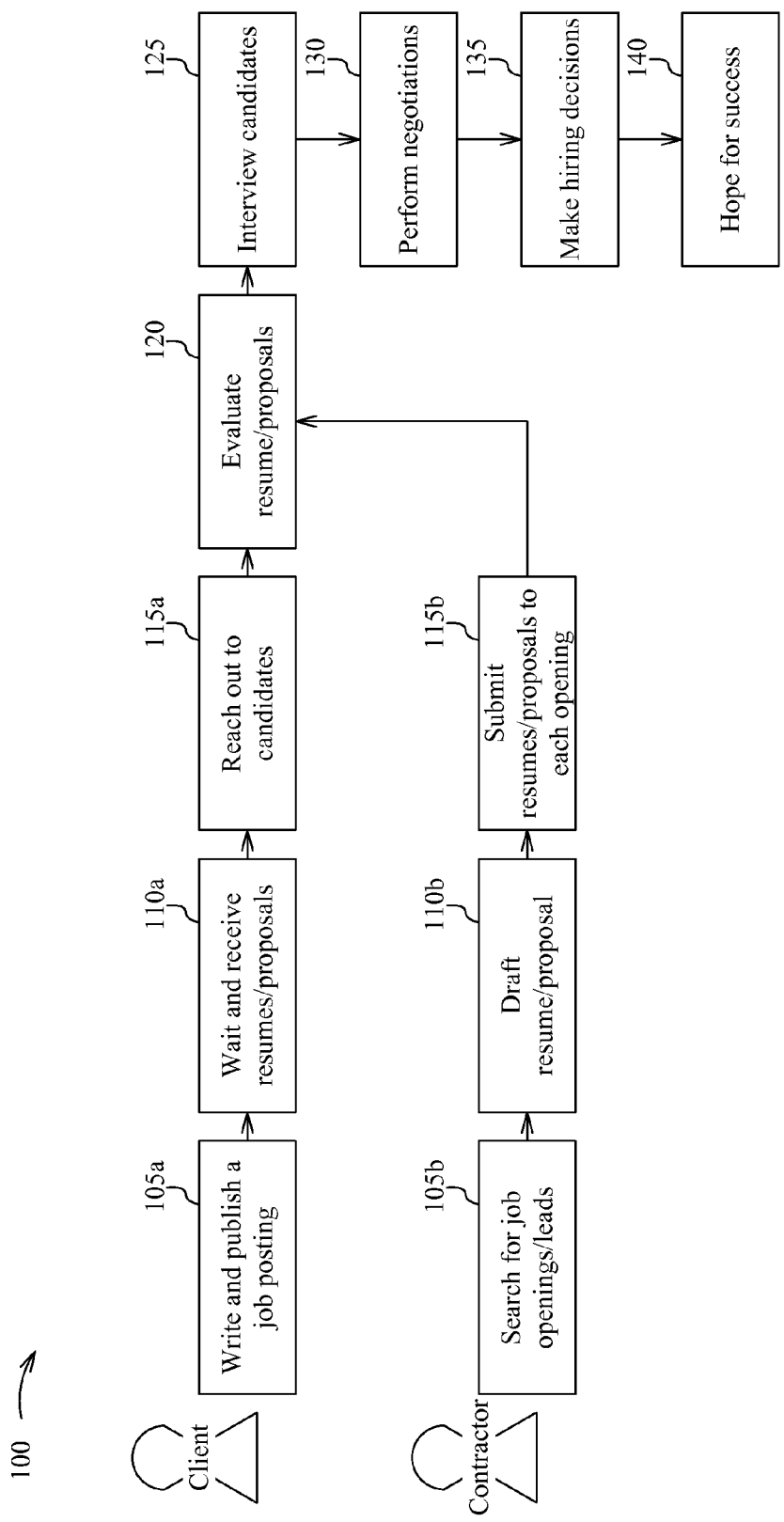
FIG. 1 illustrates a traditional hiring process.

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein or with equivalent alternatives.

Overview

Embodiments of the present invention are directed to a matching method that implements a machine learning algorithm to serve one or more matches to an individual and to ensure that an outcome of each match is more likely than not to be successful. A recommendation engine uses the machine learning algorithm to perform predictive analysis to thereby select one or more members of an online community to match or pair with the individual, based on at least structured data, unstructured data or both of the individual and/or each selected member. The recommendation engine is configured to continuously learn from past user behavior, including the individual's, to further improve future matches provided to the individual.

For example, the present invention is able to pair workers to jobs quickly, allowing a client to hire an ideal match on the spot, such as in one Internet session. In other words, in one Internet session, the client is able to provide information about a job opening, be served with one or more candidates, and hire a candidate to start work during the time period indicated by the client. In some embodiments, the present invention factors in a client's job requirements, including behavior data, and based on predicative analysis of successful outcomes, quickly search through all candidates, reviewing and taking into consideration their requirements, to find ideal matches for the job instantaneously. In some embodiments, a successful outcome is defined by the client hiring a matched candidate and providing a good feedback for that candidate after the job is completed.

Hypothetically, assume Aaden, Abigail, Finn, Kristin, Aria and Ethan are all members of an online community, such as a services marketplace in which clients find and hire contractors to fill available job openings. Aaden is a client who has a job opening that needs to be filled right away. Abigail, Finn, Kristin, Aria and Ethan are contractors within the services marketplace and have created online profiles, which include job histories describing previous and current jobs held online, offline, or both. An exemplary online profile is discussed in U.S. patent application Ser. No. 12/474,127, entitled "Online Professional Services Storefront," filed on May 28, 2009, which is hereby incorporated by reference. While Abigail, Kristin, Aria and Ethan are seasoned contractors within the services marketplace, Finn is a new contractor who has not yet looked for a job within the services marketplace. Aria, Abigail, Finn and Kristin have all indicated that they will be available to start work right away. However, Ethan has indicated that he is currently unavailable.

The present invention potentially eliminates most of the steps required in a traditional hiring process, such as that illustrated in FIG. 1. For example, there is no longer a need for a client to write and publish a job posting (step 105a), wait and receive resumes/proposals (step 110b), and/or reach out to one or more candidates and invite them to submit proposals/resumes if needed (step 115b) since the present invention advantageously presents the best candidates to the client based on at least the client's requirements. Instead, in some embodiments, the client only needs to provide a short description about the opening. The client is then served with ideal candidates for the opening. The client is able to evaluate the candidates and, optionally, view their profiles. The client is able to make a hiring decision on the spot.

For another example, there is no longer a need for a contractor to do a search through job postings or business leads (step 105b), and/or submit a resume or proposal to each opening (step 115b) since the present invention advantageously presents the best business leads or available jobs to the contractor based on at least the contractor's requirements. Instead, in some embodiments, the contractor only needs to create or update his or her online profile, and indicate his or her availability and skill sets via the online profile. The contractor is able to wait for business leads to come to him or her.

Figure 2:
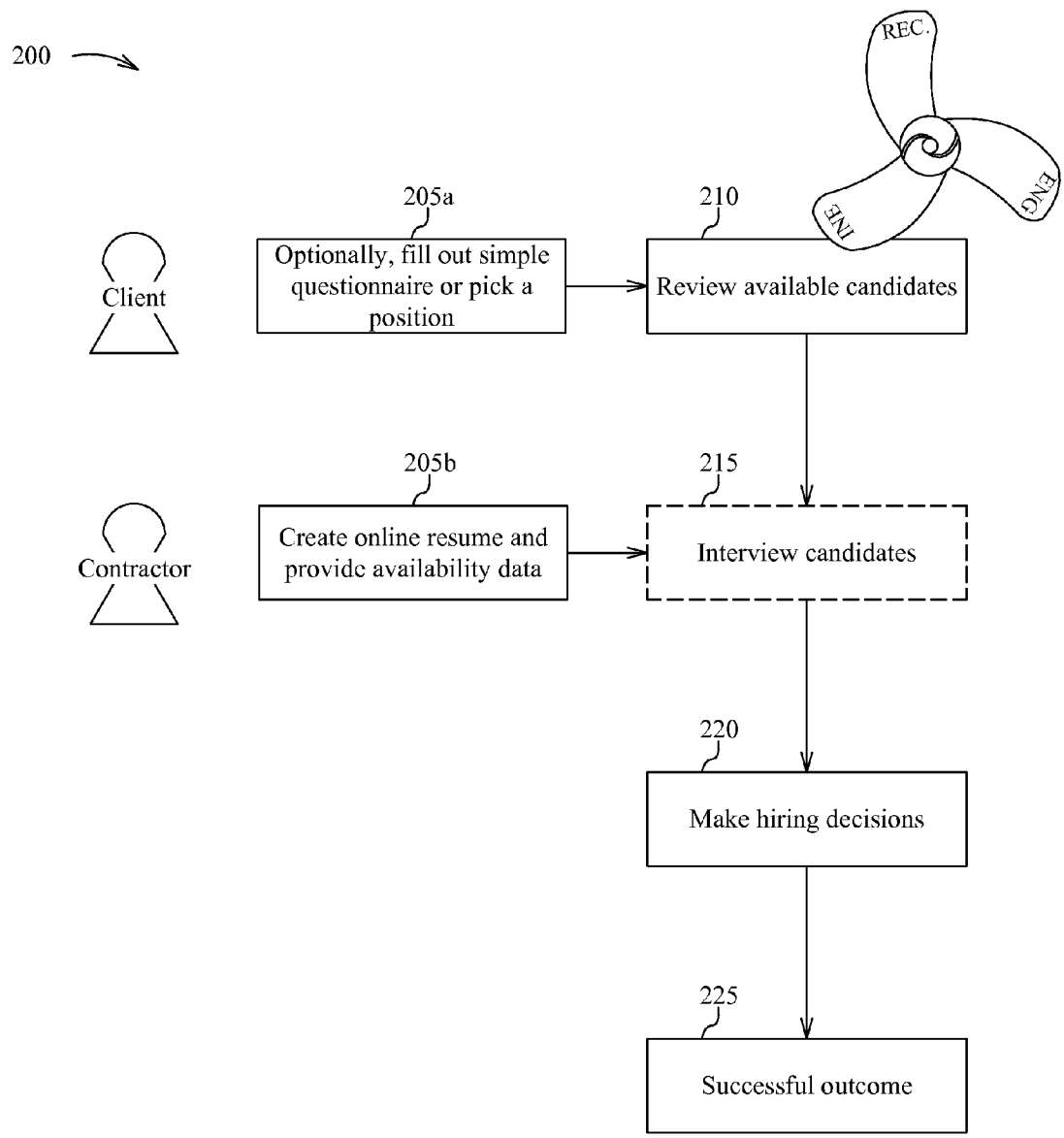
FIG. 2 illustrates an exemplary hiring process in accordance with the present invention.

FIG. 2 illustrates an exemplary hiring process 200 in accordance with the present invention. At an optional step 205a, a client is able to fill out a simple questionnaire regarding preferences (e.g., location, time zone, language, etc.) and/or is able to simply provide a position. For example, instead of writing an extensive, detailed description of the position, the client is able to simply specify "PHP developer."

At a step 205b, a contractor is able to complete an online resume or profile and provide availability information.

A recommendation engine, implementing a machine learning algorithm, then presents one or more candidates (e.g., 3 contractors) that it has determined to be the best or top matches. For example, the recommendation engine intelligently serves Abigail, Finn and Kristin as the top candidates, because the recommendation engine has determined that choosing any of them will result in a successful outcome. In some embodiments, the recommendation engine considers the client's hiring requirements and each contractor's employment requirements when making the determination. Details of the recommendation engine are discussed below.

At step 210, the client evaluates the presented candidates, such as by reviewing their profiles to see, for example, their job histories, job certificates, licenses, what time zones they are in, etc.

At an optional step 215, the client is able to interview any one of the served candidates, such as by using a communication mechanism located in their profiles. In some embodiments, a profile is configured to indicate whether a contractor is presently online. In some embodiments, a profile includes at least one communication mechanism configured to allow a direct live communication between the client and the associated contractor directly from the profile. An exemplary live communication is a telephone call, instant messaging, or video chatting. Other live communication methods are contemplated. The at least one communication mechanism allows the client to interview the contractor to thereby make a more informed hiring decision. In some embodiments, a contractor's rate is non-negotiable since it is already made known to the client. Regardless, the client is able to feel confident that choosing one from the served candidates to work with will more likely than not result in a success.

At a step 220, the client makes hiring decisions. The client is able to explicitly select or reject candidates.

At a step 225, both the client and the contractor know that the outcome will be a success (e.g., happy with each other, would want to work with each other on the present project and other projects), because the recommendation engine takes into consideration at least the client's requirements and each contractor's requirements to determine one or more matches. The determination is thus not made using one or single sided requirements.

Continuing with the example, when Aaden enters the services marketplace, he is able to indicate that he is looking to hire a PHP developer who is available today. Abigail, Finn, Kristin, Ethan and Aria all have indicated that they are familiar with PHP. All, except for Ethan, have indicated that they are currently available to start work immediately. The recommendation engine determines and presents the top 3 best matched candidates—Abigail, Kristin and Finn—to Aaden. Top matched candidates are preferably those who are available, who can do the job and who has the track record of doing the job. As such, the recommendation engine does not present Ethan as a candidate since he is currently unavailable for work. Likewise, the recommendation engine does not present Aria as a candidate since the recommendation engine has determined that Aria has only worked for and will probably work only for corporations and not for individuals. Aaden is able to thereafter correspond with any of the candidates and is able to explicitly hire Abigail on the spot because, after interviewing or talking with Abigail, she is the one whom Aaden feels the most comfortable with. Although not necessary, Aaden is able to explicitly reject Kristin, Finn or both when making a decision.

The present invention advantageously transforms the hiring process from a stop and go series of actions to a streamlined, a shopping-like exercise. The recommendation engine, as it will become apparent, significantly increases the chance of a successful outcome of a match because not only does the recommendation engine take into consideration Aaden's requirements in a hire but the recommendation engine also takes into consideration each contractor's requirements in an employment.

Recommendation Engine

Figures 3, 4:
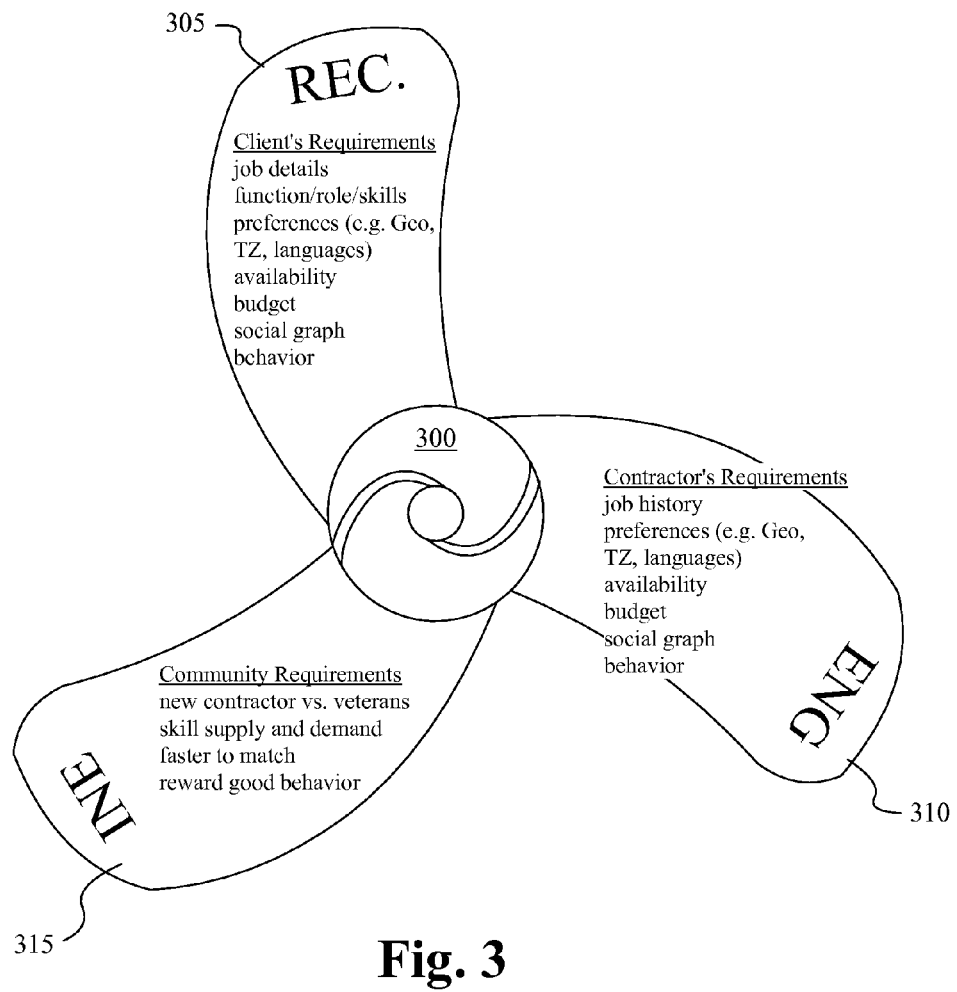
FIG. 3 illustrates an exemplary recommendation engine in accordance with the present invention.
FIG. 4 illustrates an exemplary diagram of the taxonomy of online work in accordance with the present invention.

FIG. 3 illustrates an exemplary recommendation engine 300 in accordance with the present invention. In some embodiments, the recommendation engine 300 is machine learning powered that understands a client's requirements 305, contractors' requirements 310, and community requirements 315.

The client's requirements 305 include job details, function/role/skills, geography, time zone, languages, availability, budget, social graph, and/or behavior. Other client requirements are contemplated. More or less client requirements can be considered by the recommendation engine 300. A simple questionnaire can be used to determine the type or details of job that the client is looking to be filled. The client can simply indicate that the client is looking for a graphic designer or can provide additional information, such as a logo with specific attributes (e.g., interlocking hearts representing mother and child). The client can also specify the function/role/skills of the job and preferences such as geography, time zone, languages. The client can also specify a budget range associated with the job opening. The client can also specify social networks the client is a part of to allow the recommendation engine to access social graphs in these social networks. The recommendation engine is able to take into consideration who the client's connections have hired before since it is likely that one has a more successful outcome of hiring someone that a connection has used before. The recommendation engine is also able to gather and use the client's behavior data in the services marketplace. For example, the recommendation engine could determine that Aaden in the services marketplace subconsciously hires people only from India, or hires people only in the $20-$30/hour range, even though Aaden does not explicitly state these preferences.

A contractor's requirements include job history, function/role/skills, geography, time zone, languages, availability, budget, social graph, and/or behavior. Other contractor requirements are contemplated. More or less contractor requirements can be considered by the recommendation engine 300. The contractor's job history, both within the services marketplace and offline, is based on the contractor's online profile completed by the contractor. The contractor can also specify the function/role/skills the contractor can fill or has, and preferences such as geography, time zone, languages. The contractor can also specify a budget range the contractor desires. The contractor can also specify social networks the contractor is a part of to allow the recommendation engine to access social graphs in these social networks. The recommendation engine is able to take into consideration who the contractor's connections have worked for before since it is likely that one has a more successful outcome of working for someone that a connection has worked for before. The recommendation engine is also able to gather and use the contractor's behavior data in the services marketplace. For example, the recommendation engine could determine that Abigail in the services marketplace subconsciously works for people only from India, or works only for individuals rather than big corporations, even though Abigail does not explicitly state these preferences.

The recommendation engine ensures that every aspect of data regarding a user (e.g., client, contractor) is factored in, not just structured data explicitly provided by the user but also unstructured data (e.g., behavior data) implicitly provided by the user. Unstructured data are those that are not or cannot be explicitly stated but can be learned from past behavior on the services marketplace. For example, there are two types of contractors within the services marketplace: one who does freelancing and another that is an established business. A client can have a strong preference for one over another without explicitly stating such. The recommendation engine is able to determine such preference and will only serve candidates who are individuals in future matches to the client.

For another example, even though a client had previously explicitly indicated that they prefer contractors who have at least a 3 star rating but ultimately have always chosen in the past ones that have a 5 star rating, the recommendation engine is able to determine such preference and will only present or serve candidates with a 5 star rating in future matches to the client.

For yet another example, the recommendation engine is able to determine that a client does not like to hire a contractor who have only held consulting jobs in the past or have only been involved on tertiary work (e.g., nothing core or strategic to company). The client does not indicate this in any structured manner. However, every time a contractor includes consulting positions or indicates tertiary work in his or her profile, the client does not end up hiring that contractor. The recommendation engine is able to determine such preference and will only serve candidates who have worked on core projects and have held full time jobs in future matches to the client.

For yet another example, the recommendation engine is able to determine that a contractor has consistently declined invitations to work on Christmas themed projects. The contractor has not indicated this in any structured manner. However, every time the "Christmas" word appears in the job title, the contractor declines the invitation. The recommendation engine is able to determine such preference and will not present future job leads involving Christmas to the contractor.

For yet another example, the recommendation engine is able to determine that a contractor has consistently declined invitations to work on projects for Forma, a company that the contractor for one reason or another refuses to work for. The contractor has not indicated this in any structures manner. However, every time the invitation from Forma is sent to the contractor, the contractor declines the invitation. The recommendation engine is able to determine such preference and will not present future Forma job leads to the contractor.

As discussed, the recommendation engine considers every single aspect or activity in serving an intelligent match. An activity can be as subtle as clicking on one profile over another profile for viewing. For example, Aaden's viewing of Finn's online profile is an indicator to the recommendation engine that there is something about Finn that is of interest to Aaden and to factor that into the machine learning algorithm.

In some embodiments, an action can be considered as a positive action or as a negative action. For example, Aaden's clicking on Finn's profile can be considered a positive action. For another example, Aaden explicitly rejecting Finn and Kristin as candidates can be considered negative actions. With a positive or a negative action, there is a high percentage of certainty that this is what Aaden wanted to do. Therefore, in some embodiments, activities within the services marketplace are given weights. For example, an action that is associated with a higher percentage of certainty can be given more weight than an action that is associated with a lower percentage of certainty. For another example, an action that is considered more meaningful can be given more weight than an action that is considered less meaningful. In some embodiments, the weights are tunable. Fundamentally, all actions are tracked, recorded and associated with weights, and are factored into the machine learning algorithm.

As a member (e.g., client, contractor) transacts more and more on the services marketplace, the recommendation engine will continually learn therefrom and improve the matches provided to the member based on the behavior data collected on that member. However, in some instances, the recommendation engine will not have any behavior data to collect and/or learn from because a member is new and has no activity on the services marketplace (aside from perhaps creating a job detail or a profile). In such an instance, the recommendation engine typically factors in only the new member's job detail or online profile for the new member's requirements during a matching process. However, the recommendation engine will begin to collect and learn from the new member's behavior data.

In FIG. 3, the community's requirements 315 are based on what would best benefit the services marketplace as a whole. Considerations include new contractors versus veterans. A new contractor has no record in the services marketplace and thus can have a harder time getting hired. The recommendation engine is able to serve new contractors during a match without sacrificing the likelihood of success. The considerations also include improving the supply and demand of skills within the services marketplace, faster matching and rewarding good behavior. Other community requirements are contemplated. More or less community requirements can be taken into consideration by the recommendation engine 300.

The recommendation engine 300 looks at all these requirements 305, 310, 315 to determine and present a client with a strong selection of highly relevant candidate(s) for the client to make a hire.

FIG. 4 illustrates an exemplary diagram of the taxonomy of online work in accordance with the present invention. The taxonomy of online work helps the recommendation engine understand services. A client, who has a vacant job to fill, typically first looks at function and asks "What function am I looking for?" For example, the function can be engineering, product, sales, marketing, etc. A layer deeper is the title or role of the job. For example, the title or role can be web developer, mobile developer or QA engineer. For each of the roles, there are associated skills. For example, a web developer is someone who can code PHP, HTML, JavaScript or CSS 3.0. If a client is savvy and understands the details of a job opening, then the client is able to provide the required skills. However, a client is typically only able to superficially describe a job opening and perhaps provide a role but nothing more specific than that.

A contractor approaches a job hunt from the opposite direction. The contractor typically knows skills he or she possesses, is able to determine the kinds of roles he or she can lead, and perhaps is able to explore the different functions he or she can serve. However, often times, a contractor does not know that he or she can serve in functions other those that the contractor has previously served in.

In some embodiments, the recommendation engine uses this taxonomy, which is an essential piece of tying clients and contractors together within the services marketplace. For example, if Aaden is looking for a web developer opening to be filled, the recommendation engine will match Aaden with those who have the skills required. Aaden does not need to know the specific skills (e.g., PHP, HTML, JavaSript, CSS) required for the opening. The recommendation engine advantageously determines those skills for Aaden to find candidates.

The present invention supports role or positioned based jobs and deliverable based jobs. A role or position based job is typically an ongoing service. If a client wants to build a team, the contract typically looks for someone who is looking to fill a role or position based job. However, if the client has a deliverable that needs completed, the client typically looks for someone who is looking to fill a deliverable.

Figure 5:
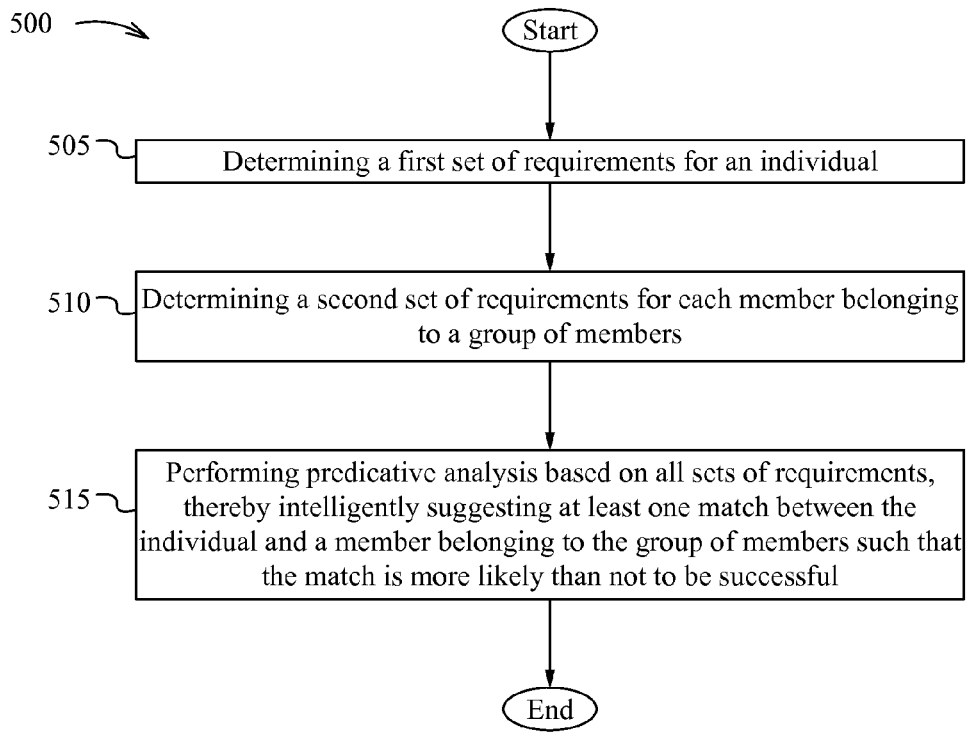
FIG. 5 illustrates an exemplary matching method in accordance with the present invention.

FIG. 5 illustrates an exemplary matching method 500 in accordance with the present invention. The method 500 begins at a step 505, where the recommendation engine determines a first set of requirements for an individual, such as a client like Aaden. The client's requirements are discussed with respect to FIG. 3.

At a step 510, the recommendation engine determines a second set of requirements for each member belonging to a group of members. The group of members can include contractors, like Abigail, Finn, Kristin, Aria and Ethan, within the services marketplace. A contractor's requirements are also discussed with respect to FIG. 3.

Figure 6:
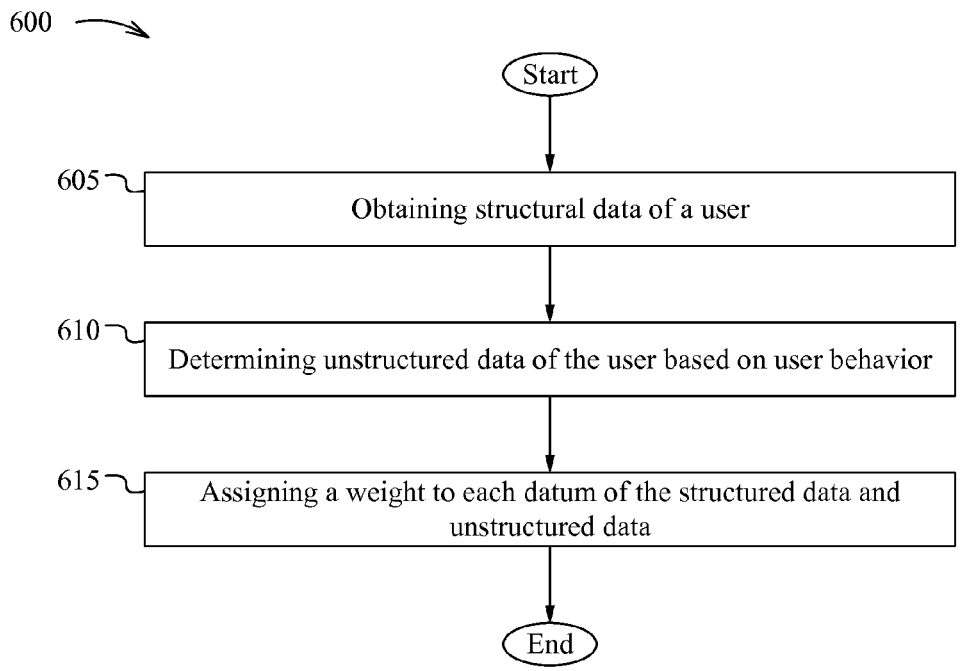
FIG. 6 illustrates an exemplary method of obtaining requirements of a user in accordance with the present invention.

Each set of requirements can include at least one structured datum, at least one unstructured datum or a combination thereof. Structured datum is typically explicit and unstructured datum is typically implicit. FIG. 6 illustrates an exemplary method 600 of obtaining requirements of a user in accordance with the present invention. The user can be a client or a contractor. The method 600 begins at a step 605, where structured data of the user is obtained. For example, structured datum can be job details (for a client), job history (for a contractor), function/role/skills, geography, time zone, languages, availability, budget, or any other expressed datum.

At a step 610, unstructured data of the user based on past behavior of the user in the community is determined. For example, unstructured datum can be a positive user action, a negative user action, or any other behavior datum.

At a step 615, a weight is assigned to each datum of the structured data and unstructured data. Typically, a datum, such as an action, that is considered more meaningful can be given more weight than a datum that is considered less meaningful. After the step 615, the method 600 ends.

Each set of requirements can also include one or more social graphs associated with one or more social networks. As discussed above, the recommendation engine can take into consideration the connections of each of the client and contractors. Typically, the client and the contractors are able to give the services marketplace the login information to these social networks. In some embodiments, the connections are also weighted.

Referring back to FIG. 5, at a step 515, the recommendation engine performs predictive analysis based on all sets of requirements, thereby intelligently suggesting at least one match between the client and a contractor such that the match is more likely than not to be successful. In some embodiments, the predictive analysis is based on a machine learning algorithm, which is configured to learn from past user behavior. In some embodiments, the recommendation engine tracks the actions of each user participating in the community. Continuing with the example, the recommendation engine serves Abigail, Finn and Kristin among all contractors as candidates. Ethan is not served as a candidate because he has indicated that he is currently unavailable for work. Aria, even though she is available for work, she has consistently declined in the past to work for individuals. The recommendation engine, aware of all these aspects, will not serve Ethan and Aria as candidates. After the step 515, the method 500 ends.

In some embodiments, the recommendation engine not only uses the client's requirements and the contractors' requirements, the recommendation engine also uses requirements of a community (e.g., services marketplace) in making the suggestion. As discussed above, the requirements of the community typically are those that best benefit the community as a whole. For example, the recommendation engine has served Finn as a candidate, even though there is no behavior data on Finn, to help Finn find a job in the services marketplace, without compromising the likelihood of success of a match.

Although the scenarios above illustrate matching contractors with a client's job opening, it should be understood that the recommendation engine not only is able to provide a client with best matched contractors, the recommendation engine is also able to provide a contractor with best matched job leads. Furthermore, the present invention has been described relative to matches in a services marketplace. However, the present invention can be applied to other types of matches.

Figure 7:
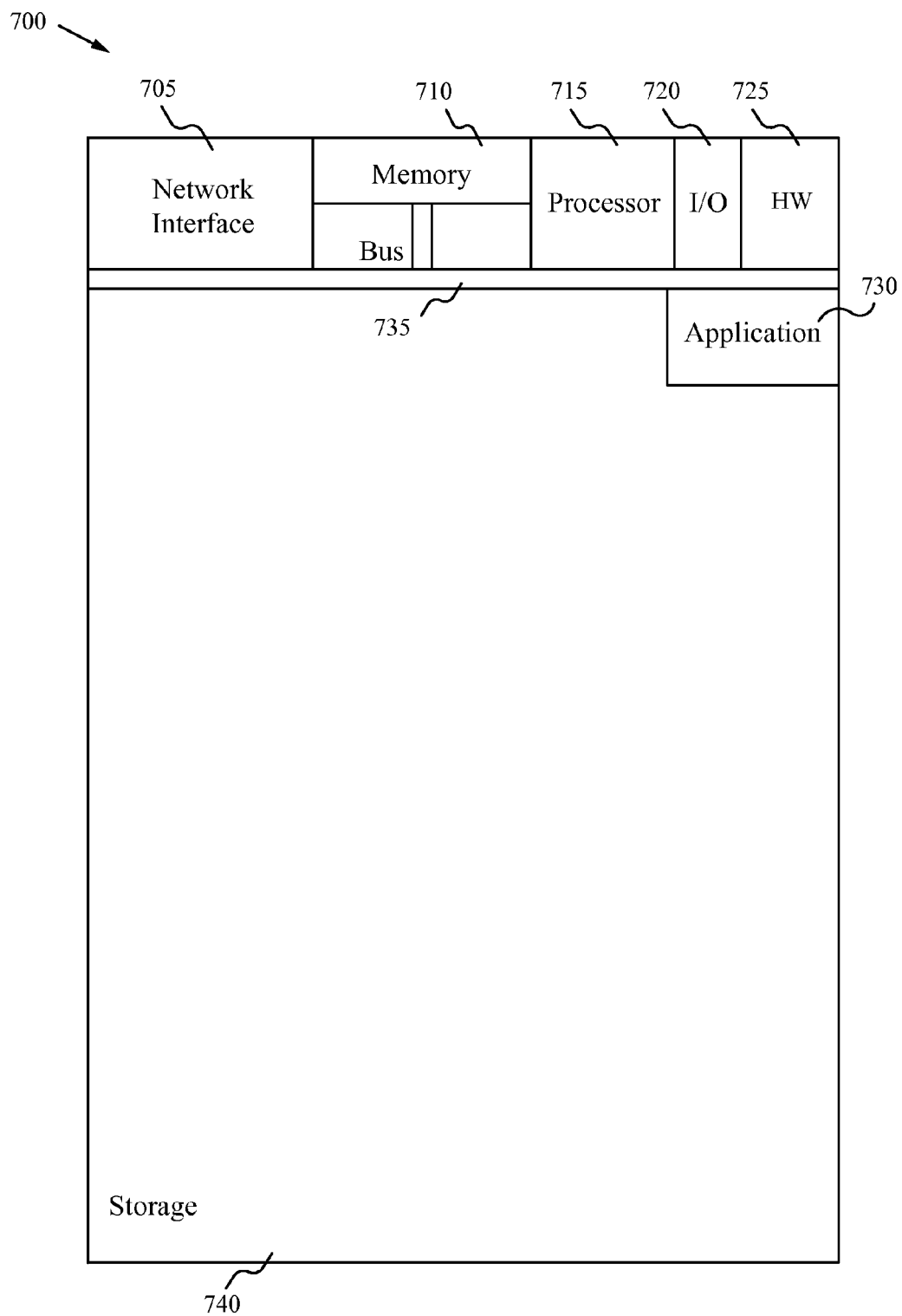
FIG. 7 illustrates a graphical representation of an exemplary computing device in accordance with the present invention.

FIG. 7 illustrates a graphical representation of an exemplary computing device in accordance with the present invention. The computing device 700 is able to serve, compute, communicate, generate and/or display highly relevant matches. For example, the computing device 700 is able to present qualified candidates to a client. For another example, the computing device 700 is able to present relevant business leads to a contractor.

In general, a hardware structure suitable for implementing the computing device 700 includes a network interface 705, a memory 710, processor 715, I/O device(s) 720, a bus 735 and a storage device 740. The choice of processor is not critical as long as the processor 715 has sufficient speed. The memory 710 is any conventional computer memory known in the art. The storage device 740 is a hard drive, CDROM, CDRW, DVD, DVDRW, flash memory card or any other storage device. The computing device is able to include one or more network interfaces 705. An example of a network interface includes a network card connected to an Ethernet or other type of LAN. The I/O device(s) 720 are able to include one or more of the following: keyboard, mouse, monitor, display, printer, modem and other devices. Software applications 730 are likely to be stored in the storage device 740 and memory 710 and are executed by the processor 715. Software applications 730 include an application configured to implement the recommendation engine. More or less components shown in FIG. 7 are able to be included in the computing device 700. In some embodiments, hardware 725 for implementing the recommendation engine is included. Although the computing device 700 in FIG. 7 includes applications 730 and hardware 725 for implementing the recommendation engine, the recommendation engine can be implemented on a computing device in hardware, firmware, software or any combination thereof.

Examples of suitable computing devices include a personal computer, laptop computer, computer workstation, a server, mainframe computer, mini-computer, handheld computer, personal digital assistant, cellular/mobile telephone, smart appliance, gaming console or any other suitable computing device.

Advantages

The recommendation engine of the present invention is configured to advantageously perform predictive analysis to intellectually pair an individual with at least one selected member of the services marketplace such that the pairing is based at least on behavior characteristics of the individual and the at least one selected member. The behavior characteristics are typically determined by the machine learning algorithm implemented by the recommendation engine. The recommendation engine is also configured to determine a first success rate of an outcome of a match between the individual and a first member, to determine a second success rate of an outcome of a match between the individual and a second member, and to advantageously present one of the two matches with the higher success rate. In some embodiments, success is defined by a hire and an eventual positive feedback after completion of the job.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A non-transitory computer-readable medium storing instructions that, when executed by a computing device, cause the computing device to perform a method comprising:
   a. determining a first set of requirements for a buyer;
   b. determining a second set of requirements for each service provider belonging to a group of service providers; and
   c. performing predictive analysis based on all sets of requirements, thereby intelligently suggesting at least one match between the buyer and a service provider belonging to the group of service providers such that the match is more likely than not to be successful, wherein each set of requirements include at least one structured datum, at least one unstructured datum or a combination thereof, wherein the at least one structured datum is explicit and the at least one unstructured datum is implicit.

2. A non-transitory computer-readable medium storing instructions that, when executed by a computing device, cause the computing device to perform a method comprising:
   a. determining a first set of requirements for a buyer;
   b. determining a second set of requirements for each service provider belonging to a group of service providers; and
   c. performing predictive analysis based on all sets of requirements, thereby intelligently suggesting at least one match between the buyer and a service provider belonging to the group of service providers such that the match is more likely than not to be successful, wherein each set of requirements include at least one structured datum, at least one unstructured datum or a combination thereof, wherein the at least one unstructured datum includes positive user actions and negative user actions.

3. A non-transitory computer-readable medium storing instructions that, when executed by a computing device, cause the computing device to perform a method comprising:
   a. determining a first set of requirements for a buyer;
   b. determining a second set of requirements for each service provider belonging to a group of service providers; and
   c. performing predictive analysis based on all sets of requirements, thereby intelligently suggesting at least one match between the buyer and a service provider belonging to the group of service providers such that the match is more likely than not to be successful, wherein each set of requirements include at least one structured datum, at least one unstructured datum or a combination thereof, wherein the at least one unstructured datum is behavior datum.

4. A non-transitory computer-readable medium storing instructions that, when executed by a computing device, cause the computing device to perform a method comprising:
   a. determining a first set of requirements for a buyer;
   b. determining a second set of requirements for each service provider belonging to a group of service providers; and
   c. performing predictive analysis based on all sets of requirements, thereby intelligently suggesting at least one match between the buyer and a service provider belonging to the group of service providers such that the match is more likely than not to be successful, wherein each set of requirements include at least one structured datum, at least one unstructured datum or a combination thereof, wherein the at least one structured datum includes function/role/skills, geography, time zone, languages, availability, budget, or a combination thereof.

5. A non-transitory computer-readable medium storing instructions that, when executed by a computing device, cause the computing device to perform a method comprising:
   a. determining a first set of requirements for a buyer;
   b. determining a second set of requirements for each service provider belonging to a group of service providers; and
   c. performing predictive analysis based on all sets of requirements, thereby intelligently suggesting at least one match between the buyer and a service provider belonging to the group of service providers such that the match is more likely than not to be successful, wherein each set of requirements include at least one structured datum, at least one unstructured datum or a combination thereof, wherein the at least one structured datum includes job details or job history.

6. A non-transitory computer-readable medium storing instructions that, when executed by a computing device, cause the computing device to perform a method comprising:
   a. determining a first set of requirements for a buyer;
   b. determining a second set of requirements for each service provider belonging to a group of service providers; and
   c. performing predictive analysis based on all sets of requirements, thereby intelligently suggesting at least one match between the buyer and a service provider belonging to the group of service providers such that the match is more likely than not to be successful, wherein the predictive analysis is based on a machine learning algorithm configured to learn from past user behavior.

7. A non-transitory computer-readable medium storing instructions that, when executed by a computing device, cause the computing device to perform a method comprising:
   a. determining a first set of requirements for a buyer;
   b. determining a second set of requirements for each service provider belonging to a group of service providers; and
   c. performing predictive analysis based on all sets of requirements, thereby intelligently suggesting at least one match between the buyer and a service provider belonging to the group of service providers such that the match is more likely than not to be successful, wherein success is defined as a hire and an eventual positive feedback.

8. A non-transitory computer-readable medium storing instructions that, when executed by a computing device, cause the computing device to perform a method comprising:
   a. determining a first set of requirements for a buyer;
   b. determining a second set of requirements for each service provider belonging to a group of service providers;
   c. performing predictive analysis based on all sets of requirements, thereby intelligently suggesting at least one match between the buyer and a service provider belonging to the group of service providers such that the match is more likely than not to be successful; and d. using requirements of a community in making the suggestion, wherein the buyer and the group of service providers belong to the community.

9. A non-transitory computer-readable medium storing instructions that, when executed by a computing device, cause the computing device to perform a method comprising:
   a. determining a first set of requirements for a buyer;
   b. determining a second set of requirements for each service provider belonging to a group of service providers;
   c. performing predictive analysis based on all sets of requirements, thereby intelligently suggesting at least one match between the buyer and a service provider belonging to the group of service providers such that the match is more likely than not to be successful; and
   d. tracking actions of each user participating in the community.

10. A non-transitory computer-readable medium storing instructions that, when executed by a computing device, cause the computing device to perform a method comprising:
   a. determining a first set of requirements for a buyer;
   b. determining a second set of requirements for each service provider belonging to a group of service providers;
   c. performing predictive analysis based on all sets of requirements, thereby intelligently suggesting at least one match between the buyer and a service provider belonging to the group of service providers such that the match is more likely than not to be successful; and
   d. providing at least one communication mechanism configured to allow a direct live communication between the buyer and the service provider belonging to the group of service providers.

11. A non-transitory computer-readable medium storing instructions that, when executed by a computing device, cause the computing device to perform a method comprising:
   a. determining a first set of requirements for a buyer;
   b. determining a second set of requirements for each service provider belonging to a group of service providers;
   c. performing predictive analysis based on all sets of requirements, thereby intelligently suggesting at least one match between the buyer and a service provider belonging to the group of service providers such that the match is more likely than not to be successful; and
   d. providing access to an online profile associated with the service provider belonging to the group of service providers.

12. A system comprising:
   a. an online community for hiring and working on demand, wherein the online community includes members; and
   b. a recommendation engine configured to perform predictive analysis to intellectually pair an individual with at least one member of the online community such that the pairing is based at least on behavior characteristics determined by a machine learning algorithm, wherein the at least one member is able to be timely committed to the individual during a specified period identified by the user.

13. A system comprising:
   a. an online community for hiring and working on demand, wherein the online community includes members; and
   b. a recommendation engine configured to perform predictive analysis to intellectually pair an individual with at least one member of the online community such that the pairing is based at least on behavior characteristics determined by a machine learning algorithm, wherein the members includes clients and contractors, wherein the clients have jobs to be filled and the contractors are looking to fill the jobs.

14. A system comprising:
   a. an online community for hiring and working on demand, wherein the online community includes members; and
   b. a recommendation engine configured to perform predictive analysis to intellectually pair an individual with at least one member of the online community such that the pairing is based at least on behavior characteristics determined by a machine learning algorithm, wherein the members includes clients and contractors, wherein the clients have jobs to be filled and the contractors are looking to fill the jobs, wherein each job is one of role based and deliverable based.

15. A system comprising:
   a. an online community for hiring and working on demand, wherein the online community includes members; and
   b. a recommendation engine configured to perform predictive analysis to intellectually pair an individual with at least one member of the online community such that the pairing is based at least on behavior characteristics determined by a machine learning algorithm, wherein the recommendation engine, the members, and the individual are communicatively coupled.

16. A system comprising:
   a. an online community for hiring and working on demand, wherein the online community includes members; and
   b. a recommendation engine configured to perform predictive analysis to intellectually pair an individual with at least one member of the online community such that the pairing is based at least on behavior characteristics determined by a machine learning algorithm, wherein the recommendation engine is also configured to determine a first success rate of an outcome of a match between the individual and a first member, to determine a second success rate of an outcome of a match between the individual and a second member, and to present one of the two matches with the higher success rate.

17. A system comprising:
   a. an online community for hiring and working on demand, wherein the online community includes members; and
   b. a recommendation engine configured to perform predictive analysis to intellectually pair an individual with at least one member of the online community such that the pairing is based at least on behavior characteristics determined by a machine learning algorithm, wherein the recommendation engine is also configured to:
      i. obtain structured data of a user;
      ii. determine unstructured data of the user based on past behavior of the user in the online community; and
      iii. assign a weight to each datum of the structured data and unstructured data.

18. A system comprising:
   a. an online community for hiring and working on demand, wherein the online community includes members; and
   b. a recommendation engine configured to perform predictive analysis to intellectually pair an individual with at least one member of the online community such that the pairing is based at least on behavior characteristics determined by a machine learning algorithm, wherein the recommendation engine is also configured to communicatively couple with one or more social networks to access one or more social graphs associated with the one or more social networks, wherein the one or more social graphs are used by the machine learning algorithm during the performance.

* * * * *